Dec. 20, 1932.  R. T. GLASCODINE  1,891,674
ROLLING STOCK
Filed March 5, 1931
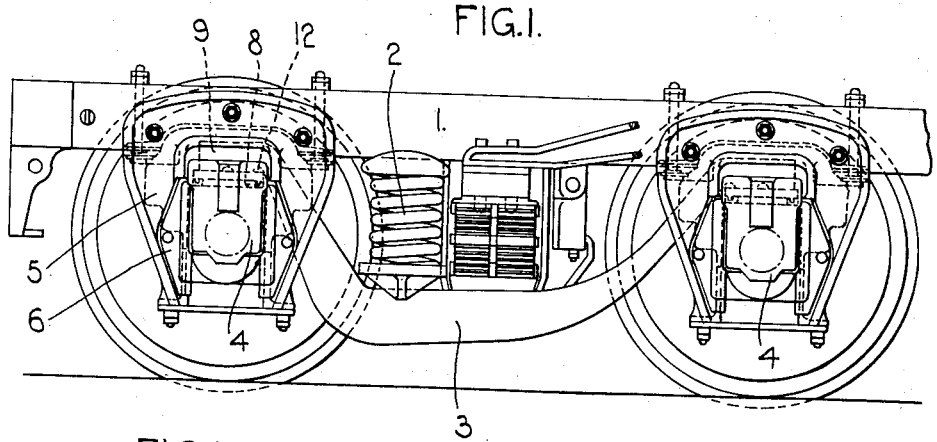
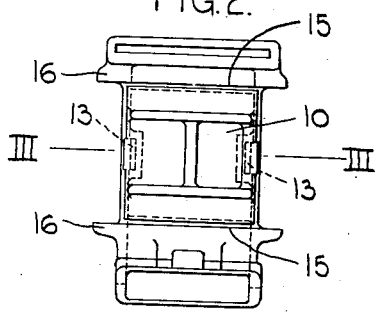
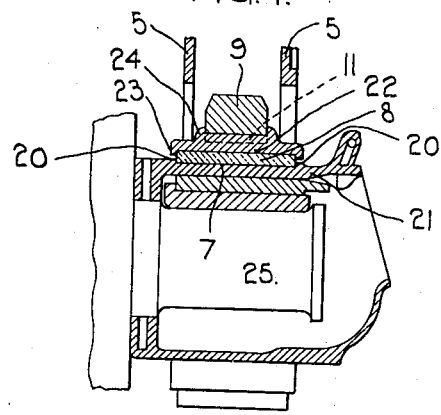
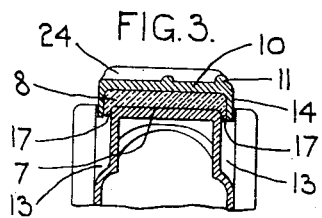
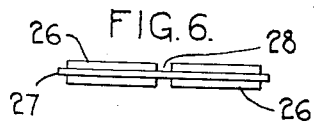
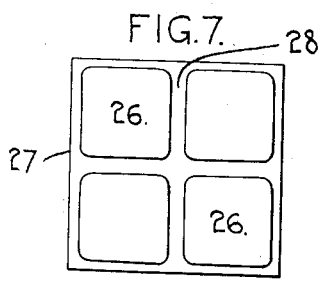
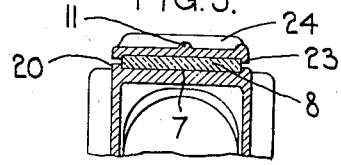
INVENTOR
RICHARD THOMSON GLASCODINE
BY Ernest P. Mechlin
ATTORNEY Patented Dec. 20, 1932

1,891,674

UNITED STATES PATENT OFFICE

RICHARD THOMSON GLASCODINE, OF LONDON, ENGLAND

ROLLING STOCK

Application filed March 5, 1931, Serial No. 520,404, and in Great Britain October 10, 1930.

This invention relates to railway vehicles and more especially to the axle boxes employed therein to support the vehicle.

The main object of the invention is to arrange a resilient or shock absorbing connection between the axle box and the vehicle frame thereby considerably enhancing the riding comfort of the vehicle and increasing the durability and freedom from likelihood of fracture of the axle box and its associated parts.

A second object is to provide such a shock absorbing connection which will remain efficient over long periods of usage without requiring frequent replacement, and further and favourable objects will appear from the following description.

Primarily the invention consists in the combination with an axle box of shock absorbing means for carrying the vehicle comprising a seat on said box, a substantial pad or block of India-rubber located on such seat, and a cover plate carrying the vehicle and uniformly distributing the load over said pad.

To avoid redundancy of expression the invention will be further described with reference to bogie trucks fitted with equalizer bars for which the axle box arrangement is especially suitable, the pad or block of India-rubber being conveniently located between the radiused portion or notched end of the equalizer bar and the axle box casting.

In a preferred embodiment, the axle box casting is arranged with a flat upper surface or platform having a peripheral lip within which the India-rubber pad or block, say of ½" or ¾" thickness, is located so as to seat firmly on said platform.

A cover or bearing plate, say of cast or pressed steel, overlies the rubber pad or block and is flanged or curved downwardly over the edges thereof into engagement with the sides of the axle box where guide slots or recesses are conveniently provided to ensure proper alignment of the cover plate while permitting its movement in a vertical plane.

The cover plate thus fixes the location of the rubber pad or block while also serving as a bearing surface to support the bogie frame and to this end may be arranged with an arcuate projection for engagement with the radiused portion or notched end of the equalizer bar to ensure proper positioning of the latter.

If desired, a corresponding arched projection can be provided on the upper surface of the rubber pad or block with which a cover plate of substantially uniform thickness may be employed or the block may be arranged with a flat upper surface and the arcuate projection cast on the outer surface of the cover plate.

To increase the carrying power of the rubber pad or block, metal reinforcing plates may be employed of usual form in which the rubber is moulded through slots in each plate on to opposite sides thereof.

Reference will now be had to the accompanying drawing which illustrates the application of the invention to the axle box of a bogie truck, and in which:—

Fig. 1 is a view partly diagrammatic, showing a bogie truck fitted with equalizer bars carried over axle boxes on substantial pads or blocks of India-rubber according to the invention.

Fig. 2 is a plan view of an axle box equipped with one form of pad,

Fig. 3 being a vertical section on the line III—III of Fig. 2.

Figs. 4 and 5 show a modified form of shock absorbing axle box cushion, Fig. 4 being a transverse section through the axle box and Fig. 5 a central vertical section.

Figs. 6 and 7 show a reinforced India-rubber pad, Fig. 6 being an elevation and Fig. 7 a plan.

Referring now to the drawing, and first more particularly to Fig. 1, the bogie truck frame is designated 1, and is supported through a suitable spring suspension 2 from equalizer bars, one of which is shown at 3 having its ends overlying the axle boxes generally designated 4.

The axle boxes 4 are flanged, and ride between the horns of the axle guards 5 secured to the bogie truck frame, and to remove any tendency to vibration of the axle boxes the vibration absorbing cushions described in co-pending application Serial No. 100

520,405 filed March 5, 1931, may be employed between the wear plates 6 and their carrying horns or pedestals or axle guard 5.

In accordance with the present invention the upper surface of the axle box 4 is formed with a flat seat 7 for the location of a substantial pad or block 8 of India-rubber upon which the end 9 of the equalizer bar rests through an interposed cover or bearing plate 10 which distributes the load of the vehicle uniformly over said India-rubber pad 8.

Arcuate or nib projections 11 may be provided on the upper surface of the cover or bearing plate 10 to engage the notches 12 in the end 9 of the equalizer bar and in the embodiment shown in Figs. 2 and 3 vertical guide channels 13 are formed in the side walls of the axle box which serve to locate and guide the cover or bearing plate 10 in relation thereto, corresponding lugs 14 being provided on such cover plate, which depend over the ends of the rubber pad into said guide channels 13.

The lugs 14 on the cover plate 10 serve also to prevent longitudinal movement of the India-rubber pad 8 while lateral location of such pad can be obtained by means of upstanding longitudinal flanges 15 which may be continuations of the customary flanges 16 which engage the wear plate 6 of the pedestal or axle guard 5.

As clearly shown in Fig 3, the India-rubber pad may have lips 17 depending over the side walls of the axle box into the guide channels 13, thereby providing some longitudinal resiliency between the axle box 4 and the equalizer bar 3 carrying the truck in addition to the shock absorbing mounting obtained by means of the substantial pad 8 of India-rubber interposed between the end 9 of the equalizer bar and the axle box 4.

In the embodiment shown in Figs. 4 and 5 the seat 7 on the axle box for locating the India-rubber pad 8 is formed with a continuous peripheral retaining lip 20, the seat 7 being recessed in the upper wall 21 of the axle box, while a cover or bearing plate 22 of modified form is employed which also has a peripheral retaining lip 23 engaging the India-rubber pad 8, which latter in this embodiment serves to locate the cover or bearing plate 22 in relation to the axle box.

11 is again an arcuate or nib projection on the upper face of the bearing plate 22 engaging the notched end 9 of the equalizer bar 3 and the equalizer bar is located laterally in regard to the axle box by being disposed in a channel formed between two upstanding longitudinal ribs 24 formed on the upper surface of the bearing plate 22.

Preferably as clearly shown in Fig. 4 the substantial pad of India-rubber 8 forming the shock absorbing cushion between the axle box 4 and the equalizer bar 3 according to the invention is located directly above the journal 25, which is mounted in the axle box in the usual manner.

In place of the plain India-rubber pad 8 illustrated in Figs. 2 to 5, a cushion such as that illustrated in Figs. 6 and 7 may be employed consisting of flat rectangular blocks 26 of India-rubber moulded through a central metal reinforcing plate 27, sufficient space being left at 28 between the blocks 26 to allow of the distortion of these latter under compression, this reinforced cushion giving an increased load capacity over a plain India-rubber block with the same area.

Alternatively the India-rubber pad 7 may be recessed or several pads may be employed located by ribs formed on the surfaces of the seat 7 and the cover or bearing plate 10 or 22 respectively.

Where the invention is applied to existing rolling stock, the upstanding lugs on the axle box which normally serve to position the equalizer bar will preferably be removed to provide the flat upper surface or seat 7 or alternatively the space between such existing lugs may accommodate a pad of India-rubber and a second pad or pads may be located on the upper surface of the axle box casting around such lugs, the cover or bearing plate 10 or 22 overlying the several pads and fixing their position on the axle box.

Where applied to stock other than that equipped with equalizer bars the pads or blocks forming the shock absorbing cushion, together with the cover or bearing plate would be located similarly on the upper surface of the axle boxes and would support the springs or other members carrying the vehicle frame.

By the arrangements according to the present invention the riding comfort and silence of the stock is considerably increased and simultaneously with the durability and freedom from likelihood of fracture.

What I claim is:—

1. In a railway vehicle the combination with an axle box of shock absorbing means for carrying the vehicle, comprising a seat on said box, a substantial cushion of India-rubber located on said seat and extending over the side walls of the axle box, a cover plate carrying the vehicle and uniformly distributing the load over said cushion and lugs on said cover plate depending over the side walls of said box and co-operating with the extended portions of the cushion to provide longitudinal resiliency between the axle box and the vehicle.

2. In a railway vehicle, the combination with an axle box of shock absorbing means for carrying the vehicle comprising a seat on the upper surface of said box extending over a substantial area thereof, guide channels in the side walls of said box, a substantial pad of India-rubber located on said seat, lips on said pad extending over the side walls of said box into said channels, a cover plate carrying the vehicle and uniformly distributing the load over said pad, and lugs on said cover plate engaging said lips and said axle box guide channels and providing longitudinal resiliency between the axle box and the vehicle.

RICHARD THOMSON GLASCODINE.